United States Patent
Arcari et al.

[11] 3,717,640
[45] Feb. 20, 1973

[54] 8-THIOUREIDOMETHYL ERGOLINE DERIVATIVES

[75] Inventors: Giuliana Arcari; Gian Carlo Fregnan; Aldemio Temperilli; Pietro Ulivi, all of Milan, Italy

[73] Assignee: Societa Farmaceutici Italia, Milan, Italy

[22] Filed: July 17, 1970

[21] Appl. No.: 55,985

[30] Foreign Application Priority Data

July 18, 1969 Italy..............................19791 A/69

[52] U.S. Cl.................................260/285.5, 424/261
[51] Int. Cl. ...........................................C07d 43/20
[58] Field of Search ....................260/285.5; 424/261

[56] References Cited

UNITED STATES PATENTS

| | | | |
|---|---|---|---|
| 3,251,846 | 5/1966 | Semonsky | 260/285.5 |
| 3,557,118 | 1/1971 | Archamone | 260/285.5 |
| 3,238,211 | 3/1966 | Camerino | 260/285.5 |
| 3,245,997 | 3/1966 | Yonan | 260/283.5 |

*Primary Examiner*—Donald G. Daus
*Attorney*—Curt M. Avery, Arthur E. Wilfond, Herbert L. Lerner and Daniel J. Tick

[57] ABSTRACT

Ergoline derivatives having anti-stress activity, and a process for making them. The compounds are of the formula:

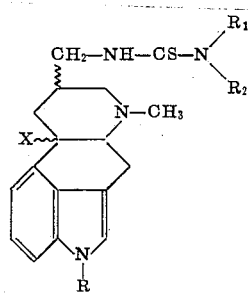

wherein R is selected from the group consisting of hydrogen and methyl; $R_1$ and $R_2$ are selected from the group consisting of hydrogen, saturated or unsaturated lower alkyl, cycloalkyl, aryl and aralkyl; $R_1$ and $R_2$ together with the nitrogen atom to which they are attached may form a heterocyclic ring; X is selected from the group consisting of hydrogen and methoxy; the bond of the substituents in the 8- and 10-positions may be 8α-, 10β- or 8β-, 10α- respectively; except for $R_1$ = hydrogen and $R_2$ = methyl, butyl and allyl in the 8β-, 10α-substituted compounds.

19 Claims, No Drawings

8-THIOUREIDOMETHYL ERGOLINE DERIVATIVES

The invention relates to ergoline derivatives which possess anti-stress activity and, particularly anti-ulcer activity. The ergoline derivatives according to the invention have the formula:

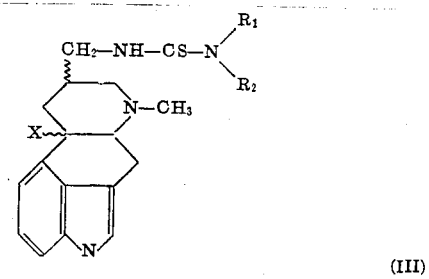

(III)

wherein R is a hydrogen atom or a methyl group; $R_1$ and $R_2$ each are a hydrogen atom, a saturated or unsaturated lower alkyl, cycloalkyl, aryl or aralkyl group or $R_1$ and $R_2$ together with the nitrogen atom to which they are attached form a heterocyclic ring; X is a hydrogen atom or a methoxy group; the bond of the sub-stituents in the 8-, 10-positions are 8α-, 10β- or 8β-, 10α- except that $R_1$ is a hydrogen atom and $R_2$ is a methyl, butyl or allyl group in 8β-, 10α- substituted compounds.

The invention includes a process for preparing these derivatives. The process comprises reacting an amine of the formula I as herein defined with thiophosgene in an organic solvent, such as dichloro-ethane or chloroform and condensing the resulting 8-thio-cyanomethyl-derivative with an amine of the formula $NHR_1R_2$, wherein $R_1$ and $R_2$ are as herein defined. The reaction with thiophosgene is preferably initially carried out in the cold, (from 0° to 10°C) and then completed in the warm (from 10° to 40°C). The condensation is preferably carried out in an organic solvent, such as an alcohol or an ether, at the boiling temperature of the solvent. When the reaction is over, the product may be isolated and purified by extraction and crystallization. This may all be represented by the following scheme:

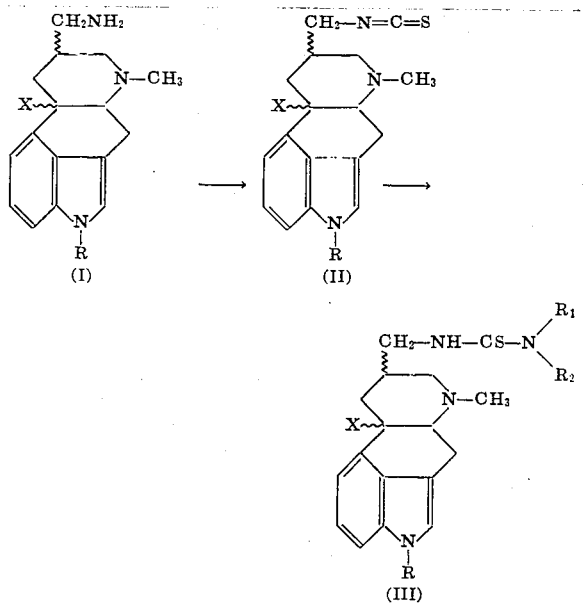

wherein X, R, $R_1$ and $R_2$ all have the above meanings. The 8-amino- methyl derivative of Formula I, the starting material for the process, can be prepared by reducing the corresponding 8-amido derivative with lithium and aluminum hydride, as described, for instance, in Camerino et al, U. S. Pat. No. 3,238,211.

The new ergoline derivatives of the invention have proved useful in therapy for preventing and treating the troubles or organic lesions provoked by every-day stress factors. The morbid causes of the lesions or of the troubles of the digestive system are particularly reduced. The derivatives of the invention show a low systemic toxicity and hardly any pharmacological action in other biological systems. They are inactive, for example, on the systemic pressure and do not show anticholinergic activity.

The activity of the derivatives of the invention has been determined on adult male rats which have been subjected simultaneously to two stressing factors; fasting and to four hours of complete immobilization and develop a considerable number of erosions or ulcers of the glandular part of the gastric mucous membrane (Bonfils et al. - Therapie 1960, 15, 1096). The lesions are similar to those described in the man after acute physical and psychical trauma. The results obtained are in Table I and show that the derivatives possess a considerable anti-ulcer activity as they reduce, even at a dose of 1 mg/kg by subcutaneous route, the number of ulcers in comparison with the controls under the same experimental conditions.

TABLE I

| No. | Compound | % Inhibition of the Number of Ulcers in Comparison to the Controls |
|---|---|---|
| 1 | 8β-thioureidomethyl-6-methyl-10α-ergoline | 86 |
| 2 | 8β-[(3ethyl-2-thioureido)-methyl]-6-methyl-10α-ergoline | 59 |
| 3 | 8β-[(3-isopropyl-2-thioureido)-methyl]-6-methyl-10α-ergoline | 36 |
| 4 | 8β-[(3-phenyl-2-thioureido)-methyl]-6-methyl-10α-ergoline | 67 |
| 5 | 8β-[(3-benzyl-2-thioureido)-methyl]-6-methyl-10α-ergoline | 53 |
| 6 | 8β-thioureidomethyl-1,6-dimethyl-10α-ergoline | 15 |
| 7 | 8α-thioureidomethyl-6-methyl-10β-ergoline | 20 |
| 8 | 8α-[(3-methyl-2-thioureido)-methyl]-6-methyl-10β-ergoline | 61 |
| 9 | 8α-](3-ethyl-2-thioureido)-methyl]-6-methyl-10β-ergoline | 57 |
| 10 | 8α-[(3-isopropyl-2-thioureido)-methyl]-6-methyl-10β-ergoline | 71 |
| 11 | 8α-[(3-allyl-2-thioureido)-methyl]-6-methyl-10β-ergoline | 47 |
| 12 | 8α-[(3-phenyl-2-thioureido)-methyl]-6-methyl-10β-ergoline | 74 |
| 13 | 8α[(3-benzyl-2-thioureido)-methyl]-6-methyl-10β-ergoline | 17 |

The capacity of the derivatives of the invention for inhibiting the gastric secretion in the rat and in the hamster (Golden Hamster) has been evaluated. The gastric secretion of animals after fasting for 24 hours was collected four hours after ligature of the pylorus and subjected to chemico-physical analyses of the gastric secretion (Shay H., Gastroenterology 1945, 5, 43). The results are in Table II and show that the derivatives of the invention reduce at a dose of 10 mg/kg by subcutaneous route, both the quantity of the gastric secretion produced in four hours and the quantity of free hydrochloric acid present in the secretion.

TABLE II

| Compound No. | Rat % Inhibition of the volume of gastric secretion in comparison to the controls | % Inhibition free HCl | Hamster (Goldern Hamster) % Inhibition of the volume of gastric secretion in comparison to the controls | % Inhibition free HCl |
|---|---|---|---|---|
| 1 | 52 | 34 | 24 | 17 |
| 2 | 11 | — | 59 | 60 |
| 3 | 52 | 36 | 45 | 38 |
| 4 | 40 | — | 7 | 44 |
| 5 | 30 | 17 | — | — |
| 8 | 44 | 33 | 39 | — |
| 9 | 40 | 21 | 44 | 46 |
| 10 | 15 | 11 | 30 | 26 |
| 11 | 15 | 13 | 30 | 23 |
| 12 | 38 | — | 21 | 40 |
| 13 | 41 | 21 | — | — |

The inhibition of the gastric secretion has been also tested on the rat having a chronic gastric fistula. (A. Lane et al, Amer. J. Physiol. 1957, 190, 221). The animals have been maintained under examination for 4 hours. The inhibition of the secreted volume, of the free hydrochloric acid and of the total hydrochloric acid present in the secretion has been calculated in comparison to tests carried out previously on the same animals. Table III lists the results obtained at different doses of the compounds when administered subcutaneously.

TABLE III

| Compound No. | Doses mg/kg | % INHIBITION | | | | | |
|---|---|---|---|---|---|---|---|
| | | 1st Hour | | | 2nd Hour | | |
| | | Secreted volume | Free HCl | Total Acid | Secreted volume | Free HCl | Total Acid |
| 9 | 10 | 80 | 50 | 33 | 33 | 37 | 33 |
| 9 | 50 | 48 | 14 | 20 | 69 | 20 | 24 |
| 10 | 10 | 43 | 10 | 14 | 38 | 12 | 16 |
| 10 | 50 | 57 | 10 | 18 | 79 | 23 | 30 |
| | | 3rd Hour | | | 4the Hour | | |
| 9 | 10 | 43 | 52 | 56 | 25 | 46 | 43 |
| 9 | 50 | 87 | 53 | 58 | 89 | 85 | 70 |
| 10 | 10 | 53 | - | 43 | 22 | 21 | 27 |
| 10 | 50 | 84 | 68 | 62 | 83 | 51 | 44 |

The invention includes pharmaceutical compositions containing a derivative according to the invention in admixture with a therapeutically acceptable excipient.
The following Examples illustrate the invention.

EXAMPLE 1

8α-Thioureidomethyl-6-methyl-10β-ergoline

One g of dihydroisolysergamide (II) was dissolved in 100 ml of anhydrous tetrahydrofuran and mixed with 1 g of lithium aluminum hydride. The mixture was refluxed for one hour, cooled and the excess of reagent was removed with 2 ml of water. After concentration to a small volume, the residue was taken up several times with warm chloroform and washed with water. The chloroform was evaporated off under vacuum. An amorphous residue was obtained, consisting of dihydroisolysergamine (II) (8α-amino-methyl-6-methyl-10β-ergoline); $[\alpha]_D^{20} = + 20°$ (c = 0.5 in pyridine).

0.52 g. of thiophosgene and 1 g of this 8α-aminomethyl-6-methyl-10β-ergoline were added, at 0°C with shaking, to a suspension of 0.6 g of calcium carbonate, 5 ml of dichloroethane and 7 ml of water. The mixture was mixed with 30 ml of chloroform, allowed to stand overnight, heated to 35°C for 30 minutes, filtered and the chloroform layer was evaporated to dryness. A solid residue of 8α-thiocyanomethyl-6-methyl-10β-ergoline was obtained. This residue was dissolved in 40 ml of methanol and mixed with 5 ml of 27 percent ammonium hydroxide. The product was refluxed for ten minutes and allowed to stand overnight. It was then evaporated under vacuum. Crystallization from methanoldiethyl ether yielded 8α-thioureidomethyl-6-methyl-10β-ergoline melting at 173°–175°C.

EXAMPLE 2

8β-Thioureidomethyl-6-methyl-10α-ergoline

Operating as in Example 1, but employing as the starting material 8β-amino-methyl-6-methyl-10α-ergoline (Gazzetta, 1964, 94, 936) 8β-thioureidomethyl-6-methyl-10α-ergoline was obtained, melting at 224°–226°C.

EXAMPLE 3

8β-Thioureidomethyl-1,6-dimethyl-10α-ergoline

Operating as in Example 1, but employing as the starting material 8β-amino-methyl-1,6-dimethyl-10α-ergoline, 8β-thioureidomethyl-1,6-dimethyl-10α-ergoline was obtained, melting at 139°–141°C.

EXAMPLE 4

8α-Thioureidomethyl-1,6-dimethyl-10β-ergoline

Operating as in Example 1, but employing as the starting material 8α-amino-methyl-1,6-dimethyl-10β-ergoline, 8α-thioureidomethyl-1,6-dimethyl-10β-ergoline was obtained.

EXAMPLE 5

Operating as in Example 1, but replacing ammonium hydroxide with the appropriate amine, there had been obtained:

8β-[(3-isopropyl-2-thioureido)-methyl]-6-methyl-10α-ergoline m.p. 170°–172°C

8β-[(3-ethyl-2-thioureido)-methyl]-6-methyl-10α-ergoline m.p. 165°–167°C

8β-[(3-phenyl-2-thioureido)-methyl]-6-methyl-10α-ergoline m.p. 229°–230°C

8β-[(3-benzyl-2-thioureido)-methyl]-6-methyl-10α-ergoline m.p. 201°–203°C

8α-[(3-methyl-2-thioureido)-methyl]-6-methyl-10β-ergoline m.p. 148°–150°C

8α-[(3-ethyl-2-thioureido)-methyl]-6-methyl-10β-ergoline m.p. 136°–138°C

8α-[(3-isopropyl-2-thioureido)-methyl]-6-methyl-10β-ergoline m.p. 153°–155°C

8α-[(3-allyl-2-thioureido)-methyl]-6-methyl-10β-ergoline m.p. 126°–128°C

8α-[(3-phenyl-2-thioureido)-methyl]-6-methyl-10β-ergoline m.p. 143° – 145°C

8α-[(3-benzyl-2-thioureido)-methyl]-6-methyl-10β-ergoline m.p. 138° – 140°C

8α-[(3-cyclohexyl-2-thioureido)-methyl]-6-methyl-10β-ergoline m.p. 160° – 163°C

8α-[(3,3'-diethyl-2-thioureido)-methyl]-6-methyl-10β-eroline m.p. 145° – 148°C

8α-[(3,3'-cyclopentamethylene-2-thioureido)-methyl]-6-methyl-m.p. 140° – 144°C

8β-[(3-ethyl-2-thioureido)-methyl]-6-methyl-10α-methoxyergoline m.p. 170° – 175°C 8β-[(3-phenyl-2-thioureido)-methyl]-6-methyl-10α-methoxyergoline m.p. 160° – 165°C

We claim:
1. 8α-thioureidomethyl-6-methyl-10β-ergoline.
2. 8β-thioureidomethyl-6-methyl-10α-ergoline.
3. 8β-thioureidomethyl-1,6-dimethyl-10α-ergoline.
4. 8α-thioureidomethyl-1,6-dimethyl-10β-ergoline.
5. 8β-[(3-ethyl-2-thioureido)-methyl]-6-methyl-10α-ergoline.
6. 8β-[(3-isopropyl-2-thioureido)-methyl]-6-methyl-10α-ergoline.
7. 8β-[(3-phenyl-2-thioureido)-methyl]-6-methyl-10α-ergoline.
8. 8β-[(3-benzyl-2-thioureido)-methyl]-6-methyl-10α-ergoline.
9. 8α-[(3-methyl-2-thioureido)-methyl]-6-methyl-10β-ergoline.
10. 8α-[(3-ethyl-2-thioureido)-methyl]-6-methyl-10β-ergoline.
11. 8α-[(3-isopropyl-2-thioureido)-methyl]-6-methyl-10β-ergoline.
12. 8α-[(3-allyl-2-thioureido)-methyl]-6-methyl-10β-ergoline.
13. 8α-[(3-phenyl-2-thioureido)-methyl]-6-methyl-10β-ergoline.
14. 8α-[(3-benzyl-2-thioureido)-methyl]-6-methyl-10β-ergoline.
15. 8α-[(3-cyclohexyl-2-thioureido)-methyl]-6-methyl-10β-ergoline.
16. 8α-[(3.3'-diethyl-2-thioureido)-methyl]-6-methyl-10β-ergoline.
17. 8α-[(3,3'-cyclopentamethylene-2-thioureido)-methyl]-6-methyl-10β-ergoline.
18. 8β-[(3-ethyl-2-thioureido)-methyl]-6-methyl-10α-methoxyergoline.
19. 8β-[(3-phenyl-2-thioureido)-methyl]-6-methyl-10α-methoxyergoline.

* * * * *

UNITED STATES PATENT OFFICE
CERTIFICATE OF CORRECTION

Patent No. 3,717,640  Dated  February 20, 1973

Inventor(s) Giuliana Arcari; Gian Carlo Fregnan; Aldemio Temperilli
Pietro Ulivi;

It is certified that error appears in the above-identified patent and that said Letters Patent are hereby corrected as shown below:

Column 1, structural formula (III):

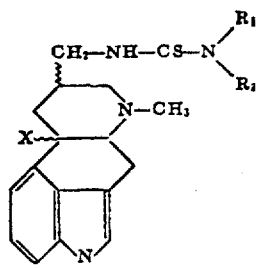

(III) "

should read

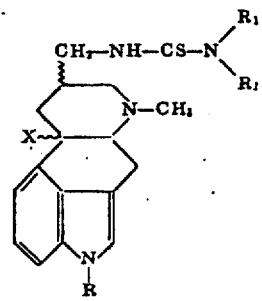

(III) --

Column 2, line 24: "Therapie 1960, 15, 1096)." should read -- Therapie 1960, 15, 1096). --. Column 2, line 69: "Gastroenterology 1945, 5, 43)." should read -- Gastroenterology 1945, 5, 43). --. Column 3, line 27: "Physiol. 1957, 190, 221)." should read -- Physiol. 1957, 190, 221). --. Column 4, line 30: "(Gazzetta, 1964, 94, 936)" should read -- (Gazzetta, 1964, 94, 936) --. Column 5, line 10:

PO-1050
(5/69)

UNITED STATES PATENT OFFICE
CERTIFICATE OF CORRECTION

Patent No. 3,717,640                Dated     February 20, 1973

Inventor(s) Giuliana Arcari; Gian Carlo Gregnan; Aldemio Temperilli; Pietro Ulivi.

It is certified that error appears in the above-identified patent and that said Letters Patent are hereby corrected as shown below:

"methyl]-6-methyl - m.p. 140°-144°C" should read -- methyl]-6-methyl-10β-ergoline - m.p. 140°-144°C --. Column 6, line 1 of claim 16: "8α-[(3.3'-" should read -- 8α-[(3,3'- --.

Signed and sealed this 12th day of February 1974.

(SEAL)
Attest:

EDWARD M. FLETCHER, JR.          C. MARSHALL DANN
Attesting Officer                 Commissioner of Patents